United States Patent Office 2,750,009
Patented June 12, 1956

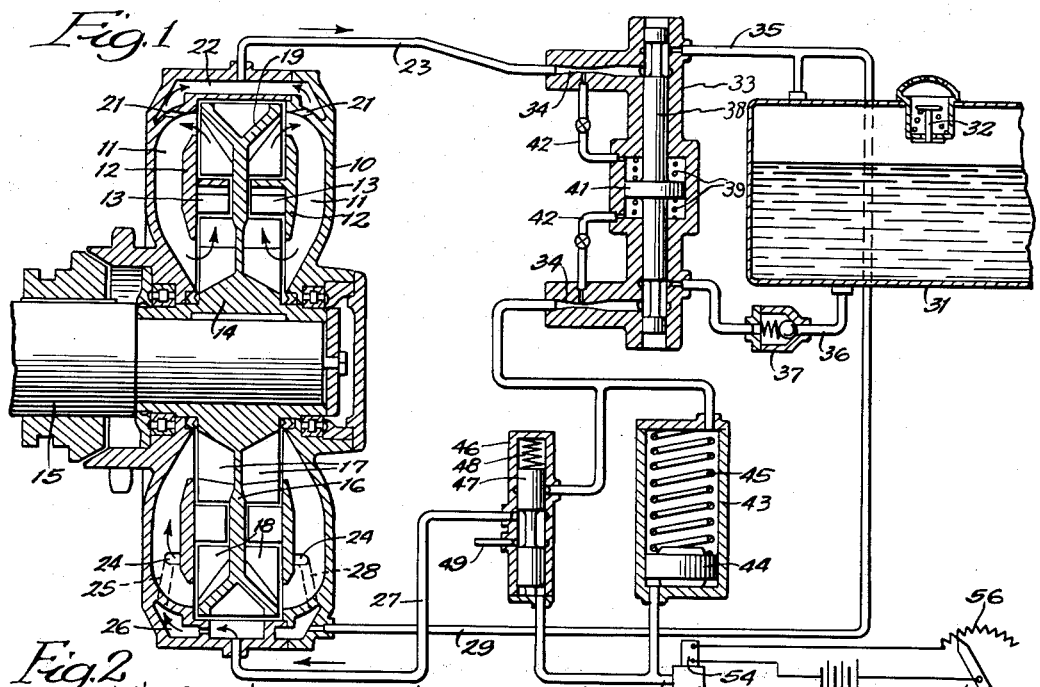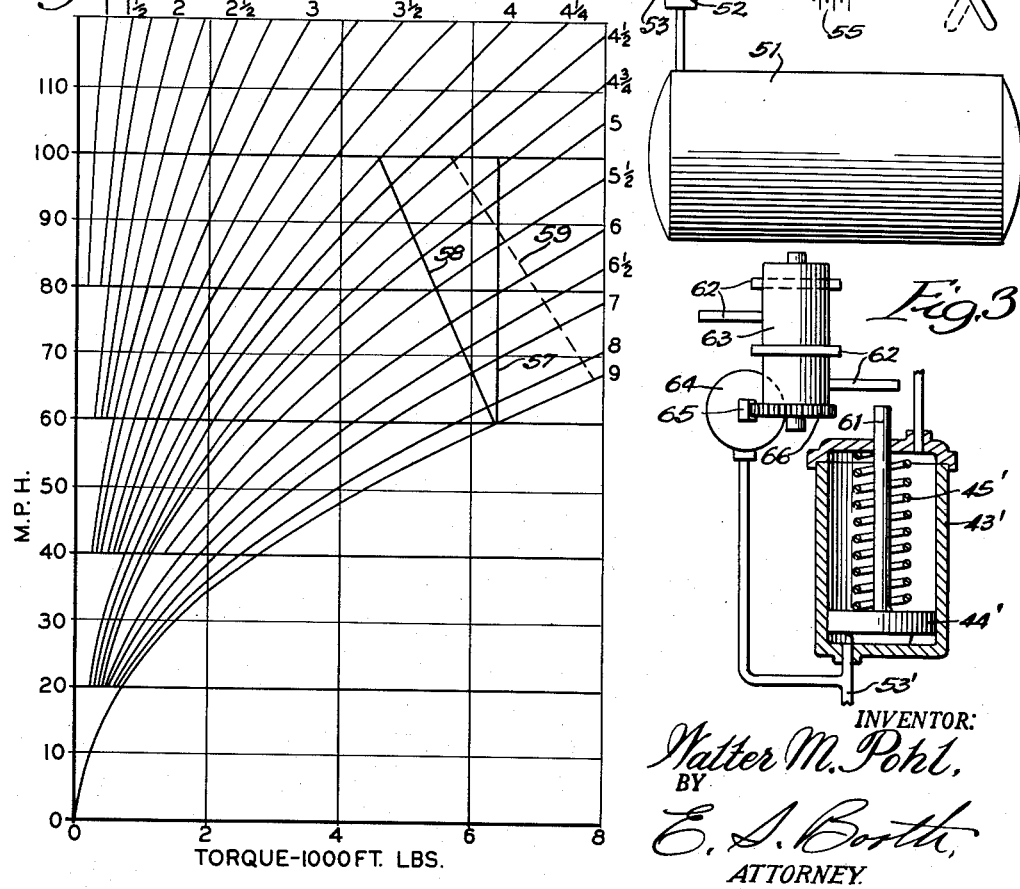

2,750,009

HYDRO-KINETIC BRAKING SYSTEMS

Walter M. Pohl, Chicago, Ill., assignor to Foote Bros. Gear and Machine Corporation, Chicago, Ill., a corporation of Illinois Application November 17, 1951, Serial No. 256,910

16 Claims. (Cl. 188—90)

This invention relates to hydro-kinetic braking systems, and more particularly to a braking system for use on vehicles such as railway cars to obtain accurately controlled braking.

Vehicle brakes, and specifically railway car brakes, have heretofore generally been of the friction type in which a friction shoe engages a brake drum or flange or, in many cases, the rim of the wheel itself to apply the braking force. Friction brakes are subjected to substantial wear of both shoes and wheels or drums making it difficult to keep them properly adjusted, and are also subject to varying coefficient of friction due to velocity and grease, dampness or dirt on the braking surfaces. It is therefore extremely difficult to control brakes of this type to obtain the desired controlled braking effect. Furthermore, lengthy applications as in slowing down trains in descending grades, tends to overheat the brakes to the extent where failures may result.

It is accordingly one of the objects of the present invention to provide a hydro-kinetic braking system adapted for use on vehicles such as railway cars, and which is easily and accurately controlled to produce the desired degree of braking.

Another object is to provide a braking system in which the braking force is easily and accurately controlled by controlling the quantity of liquid in the brake. According to one feature of the invention, the quantity of liquid is controlled by a fluid pressure such, for example, as the pressure supplied by a standard railway control valve and speed governor as used on high speed trains.

Still another object of the invention is to provide a braking system in which liquid is circulated through the brake at a maximum flow rate under all braking conditions to prevent heating and flow of liquid into and from the brake is regulated to maintain the desired quantity of liquid in the brake. According to one feature the flow of liquid to and from the brake is controlled in response to a difference in the rates of flow to maintain the flows equal.

A further object is to provide a braking system in which the quantity of liquid in the brake is varied by a variable volume accumulator connected to the inlet conduit for the brake, and whose volume is varied in accordance with a controlling pressure.

A still further object is to provide a braking system in which the brake is emptied by venting the liquid inlet thereof to atmosphere.

According to one feature the vent valve is closed by the same controlling pressure which controls the accumulator so that it will be closed whenever there is liquid in the brake.

The above and other objects and features of the invention will be more readily apparent from the following description when read in connection with the accompanying drawing in which:

Figure 1 is a diagrammatic view with parts shown in section of a braking system embodying the invention;

Figure 2 is a graph illustrating the operating characteristics of the brake; and Figure 3 is a partial view of an alternative liquid control.

The brake as shown in Figure 1, employs a hydro-kinetic brake unit of the type more particularly disclosed and claimed in the patent to Carson et al. 2,150,539. This brake as illustrated, comprises an outer casing 10 which may be secured to a vehicle frame such as the body of a railway car to prevent rotation thereon. The casing 10 is provided on its interior with vanes 11 which extend radially at opposite sides thereof and which are secured at their inner edges to blocking rings 12. The blocking rings carry short vane extension 13, all as specifically shown and described in the Carson patent.

A rotor is rotatably mounted in the casing and comprises a hub 14 which may be mounted on a shaft 15 such as the axle of a vehicle, or an extension thereof. The hub carries a radially extending central web 16 which is formed on its opposite sides with inner vanes 17 lying radially within and registering with the vanes 13 and other vanes 18 lying radially beyond the vanes 13. At the outer end of the unit the web 16 splits into a Y shape as indicated at 19 to form two separated fluid circuits through the vanes.

While one specific type of hydro-kinetic brake unit is shown and described, it will be apparent that many of the features of the present invention are applicable to units of other types.

To circulate liquid through the brake unit, the casing is formed near its outer periphery with outlet ports 21 which are so positioned and shaped that they will be subject to both the centrifugal head on the liquid circulating over the vanes and to the impact velocity thereof so that liquid in the casing tends to discharge therethrough. The ports 21 communicate with a discharge space 22 formed at the periphery of the brake unit which is connected to a discharge conduit 23.

An additional series of ports 24 are formed in the vanes 11 at a point closely adjacent to the blocking rings 12 so that these ports lie near the center portion of the toroidal liquid ring flowing over the vanes. The ports 24 are therefore at a low pressure point in the circuit and also lie at the point where air tends to accumulate as liquid is supplied to the unit. In a typical construction 8 ports 24 are provided on each side of the brake unit.

Five of the 8 ports 24 on each side are utilized as inlet ports and for this purpose communicate through passages indicated at 25, with supply chambers 26 formed in the casing. The supply chambers 26 are connected to an inlet conduit 27. The remaining 3 ports 24 on each side of the brake unit serve as vent ports. For this purpose they communicate through passages 28 with a vent pipe 29.

During operation of the brake liquid is continuously circulated therethrough to prevent overheating, the liquid if desired being passed through an external radiator and reservoir unit as indicated at 31. As shown, the reservoir 31 is in the form of a tank which may be conveniently mounted on the vehicle for free flow of air therethrough to cool the liquid and is vented through a vent valve 32. The supply and discharge conduits 27 and 23 communicate with the reservoir to form therewith a closed circulating system through which fluid from the brake unit may circulate to be cooled.

In order to maintain the external circulation through the reservoir without altering the quantity of liquid in the brake unit flow control valves are provided in the inlet and discharge conduits. As shown, the valves are formed by a common casing 33 having cylindrical bores in its ends provided with ports to communicate with the reservoir and the conduits. At one side the casing is formed with a pair of venturis 34 which are connected respectively with the discharge conduit 23 and the inlet conduit 27 as shown. Opposite ports registering respectively with the venturis are connected to a pipe 35 which discharges into the top of the reservoir 31 and with a pipe 36 which communicates with the bottom of the reservoir. A check valve 37 opening away from the reservoir is provided in the pipe 36.

The valve ports are controlled by a valve plunger 38 having reduced spool portions near its opposite ends variably to restrict the ports. Preferably the plunger is so formed that its spool portions register completely with the ports at the opposite ends of the valve when the plunger is in a centered position as shown. If the plunger is moved upward slightly it will restrict flow through the discharge conduit 23 without affecting flow through the inlet conduit 27 while downward movement thereof will restrict flow through the conduit 27 without affecting discharge flow through the conduit 23.

The plunger is normally centered by springs 39 which bear against opposite faces of a piston portion 41 in the central part of the plunger and which fits slidably in an enlarged central part of the valve housing 33. The springs 39 normally hold the plunger in its centered position and it is adapted to be shifted one way or the other from center in accordance with the difference in the flow through the inlet and discharge conduits. For this purpose opposite ends of the enlarged housing portion on opposite sides of the piston 41 are connected to the throats of the venturis 34 respectively, through connections 42.

When the flows are equal the pressures at the venturi throats will be equal and the valve plunger will remain centered. Assuming that the discharge flow is greater than the inlet flow the pressure at the throat of the upper venturi 34 will drop so that the piston 41 and valve plunger 38 will shift upward to throttle the discharge flow until it is again equal to the inlet flow. If the inlet flow is greater, the plunger will be shifted downward in the same manner so that under all conditions flow through the inlet and discharge conduits will be maintained equal and the quantity of liquid in the brake unit will remain constant.

It will be noted that flow through the reservoir is produced by the differential pressures existing at the ports 21 and 24 so that whenever the brake is operating there will be a tendency for liquid to flow through the circuit.

The quantity of liquid in the brake is controlled by a variable volume accumulator 43 which, as shown, comprises a cylinder having a floating piston 44 therein which is urged toward the lower end of the cylinder by a spring 45. The upper end of the cylinder is connected to the inlet conduit 27 at a point between the control valve and the brake unit and the space above the piston 44 is always filled with liquid.

To empty the unit a vent valve 46 is provided shown as a spool type valve having a spool 47 shiftable therein and normally urged downward by a spring 48. When the spool is in its downward position it connects the inlet pipe 27 to an atmospheric vent 49 and closes the inlet pipe at the accumulator and control valve side thereof. When the spool 47 is shifted upward it closes the atmospheric vent 49 and opens the inlet conduit 27 for flow therethrough.

The accumulator and the vent valve are controlled in response to fluid pressure which may be derived from any desired controlling source. In the example illustrated, the brake is adapted to be used on a railway car which is provided with the usual compressed air storage tank 51 and the usual control valve and speed governor 52 which will supply a regulated controlling pressure from the tank 51 to a conduit 53. The control valve may be controlled electrically in the usual manner and as illustrated, is provided with an electrical actuating device 54 which is connected to a source of current 55 through a control rheostat 56. It will be understood that this electrical system as shown, is intended to be only diagrammatically suggestive of the usual electrical control system for the train control valves. In any event the valve 52 will supply to the conduit 53 a controlled fluid pressure which in turn, controls the desired degree of braking force.

The conduit 53 as shown, is connected to the lower part of the vent valve and to the bottom of the accumulator below the piston 44. Whenever pressure is supplied to the conduit 53, the vent valve will immediately move to its upper closed position and the accumulator piston 44 will move upward in the accumulator cylinder, until the fluid pressure on the piston is balanced by the spring 45. Movement of the piston 44 will force a quantity of liquid proportional to the pressure under pressure from the accumulator into the inlet conduit 27. This fluid can not flow backward into the reservoir because of the check valve but will flow to the lower side of the piston 41 through the connection 42 to elevate the piston and the valve plunger 38 to close the discharge conduit 23. The liquid will then flow into the brake housing and will circulate over the vanes in the usual manner to produce a braking effect which is proportional to the quantity of liquid in the brake.

As soon as pressure produced by the accumulator is dissipated by the flow of liquid into the brake which will occur relatively quickly, the pressure acting on the bottom of the piston 41 will disappear and the piston will return to its centered position. With liquid in the brake it will immediately begin to flow into the discharge conduit to the reservoir and at the same time liquid will flow from the reservoir through the inlet conduit into the brake. Action of the control valves as described above, will maintain these flows equal so that the quantity of liquid in the brake at any one time is that determined by the position of the accumulator piston. However, a full flow of liquid through the reservoir will occur at all times so that the liquid will be properly cooled. It will be understood that as more pressure is applied to the accumulator more liquid will be forced into the brake to produce a greater braking action.

A typical operation for railway use is indicated by the chart Figure 2 wherein vertical distances represent miles per hour and horizontal distances represent torque in thousands of pounds. The several curves numbered 1 through 9 illustrate the braking conditions which will occur with different quantities of liquid in the brake, the numbers designate the curves indicating the quantity of liquid in the brake in gallons. It will be seen from these curves that the braking torque varies with the speed as well as with the quantity of liquid in the unit.

In railway braking especially, another factor must be considered which is that the coefficient of friction between the wheels and the rails changes with speed and with the condition of the rails. For this reason, a smaller braking torque can be used at high speed than at low speed. Therefore, for maximum braking a less braking force is desired at higher speeds than at lower speeds and this is normally accomplished through the control valve and speed governor. In the diagram of Figure 2, the straight vertical line 57 indicates constant braking torque conditions at speeds between 100 miles per hour and 60 miles per hour. Below 60 miles per hour the braking force will necessarily fall off with the speed along the lowermost curve 9 which is the curve corresponding to complete filling of the brake unit.

If the brakes were actually applied in accordance with the line 57 at speeds above 60 miles per hour, slipping of the wheels would occur which is very undesirable. It is therefore necessary to have a lower braking torque at higher speeds with the braking torque gradually increasing as the speed decreases along the straight line 58 for wet rails or along the dotted line 59 for dry rails until 60 miles per hour is reached and the brake unit is completely filled. These lines 58 and 59 therefore represent the optimum braking curve for maximum rate stopping under wet and dry rail conditions.

With the present system braking can be accurately controlled to follow the lines 58 or 59 by adjustment of the control valve and speed governor in much the same manner that they are presently controlled in friction braking installations. Any different characteristics desired can easily be obtained by changing the settings of the speed governor so that the desired braking effect will be produced. It will be understood of course, that when less than maximum available braking is desired, the brake unit will be filled with less fluid than the quantities indicated by the lines 58 or 59 at the existing speed so that a very accurate braking is produced.

It will furthermore be noted that with the hydrokinetic brake of the present invention, braking conditions will always be the same and will not be subject to variations such as those caused by velocity or by foreign matter on the braking surfaces of a conventional friction brake. Furthermore, overheating will not occur under either partial or full braking conditions since at all times liquid is circulated through the brake through the open control valves and the reservoir to be cooled.

When the brakes are to be released, pressure in the line 53 is relieved so that the accumulator piston 44 will move to the bottom of the cylinder. At the same time pressure beneath the valve spool 47 will be relieved and this spool will move downward to open the atmospheric vent 49 to the inlet conduit 27. Under these conditions liquid flowing out of the reservoir into the inlet conduit will enter the accumulator and an equal quantity of liquid will discharge through the discharge conduit 23. At the same time air will be vented into the brake unit until it is completely emptied of liquid and contains only air. Under these conditions the braking action is negligible so that the vehicle can run freely.

Figure 3 shows an alternative arrangement to provide a positive step type control for the volume of fluid forced into the brake unit by the accumulator, parts therein corresponding to like parts in Figure 1 being indicated by the same reference numerals primed. In this construction the piston 44' has a piston rod 61 extending through the top of the accumulator and the spring 45' is relatively light so that the piston will tend to move fully up in the accumulator in response to a small pressure supplied beneath the piston.

Movement of the piston is stopped by engagement of the rod 61 with one or another of several axially spaced stop lugs 62 on a rotatable body 63 which are successively swung into alignment with the piston rod as the body is turned. The body is turned by an air cylinder 64 connected to the pipe 53' and which will move to a position corresponding to the pressure in the pipe. The air cylinder may be connected to the body 63 to turn it through a rack 65 moved by the air cylinder and meshing with a pinion 66 on the body or in any other desired manner.

With this construction whenever pressure is supplied through the pipe 53' the piston will move up until the rod 61 strikes one of the stop lugs 62 thus positively to limit and control the quantity of liquid supplied to the brake unit. The same pressure will act through the air cylinder 64 to turn the body 63 so that the desired stop lug 62 will be in line with the piston rod. In this way the quantity of liquid in the brake unit will be accurately controlled in a number of distinct steps which may correspond to the separate pressure steps produced by the usual train control valve and speed governor.

While one embodiment of the invention has been shown and described in detail, it will be understood that this is illustrative only and is not to be taken as a definition of the scope of the invention, reference being had for this purpose to the appended claims.

What is claimed is:

1. A hydro-kinetic braking system comprising a brake unit including a vaned casing and a vaned rotor in the casing, a liquid circuit including inlet and outlet connections to the casing through which liquid can flow into and out of the brake unit, flow control valves in the inlet and outlet connections, and control means jointly responsive to the flow through the inlet and outlet connections to control the control valves thereby to maintain the flows through the inlet and outlet connections equal.

2. A hydro-kinetic braking system comprising a brake unit including a vaned casing and a vaned rotor in the casing, a liquid circuit including inlet and outlet connections to the casing through which liquid can flow into and out of the brake unit, flow control valves in the inlet and outlet connections, a movable control member connected to both of the control valves simultaneously to adjust them in opposite directions, and connections from the opposite sides of said member to the inlet and outlet connections respectively so that the member will be moved to adjust the valves when the flows through the inlet and outlet connections are unequal.

3. A hydro-kinetic braking system comprising a brake unit including a vaned casing and a vaned rotor in the casing, a liquid circuit including inlet and outlet connections to the casing through which liquid can flow into and out of the brake unit, flow control valves in the inlet and outlet connections, a movable control member connected to both of the control valves simultaneously to adjust them in opposite directions, venturi passages in the connections, and connections from the throats of the venturi passage respectively to the opposite sides of the control member.

4. A hydro-kinetic braking system comprising a brake unit including a casing and a rotor in the casing, a liquid reservoir, inlet and outlet flow conduits connecting the reservoir and the casing through which liquid can flow into and out of the casing, flow control valves in the inlet and outlet conduits, and control means responsive to a difference in flow through the conduits to adjust the valves thereby to maintain the flows through the conduits equal.

5. A hydro-kinetic braking system comprising a brake unit including a casing and a rotor in the casing, a liquid reservoir, inlet and outlet flow conduits connecting the reservoir and the casing through which liquid can flow into and out of the casing, flow control valves in the inlet and outlet conduits, control means responsive to a difference in flow through the conduits to adjust the valves thereby to maintain the flows through the conduits equal, and a variable volume accumulator connected to the inlet conduit to vary the volume of liquid in the brake unit.

6. A hydro-kinetic braking system comprising a brake unit including a casing and a rotor in the casing, a liquid reservoir, inlet and outlet flow conduits connecting the reservoir and the casing through which liquid can flow into and out of the casing, flow control valves in the inlet and outlet conduits, control means responsive to a difference in flow through the conduits to adjust the valves thereby to maintain the flows through the conduits equal, a variable volume accumulator connected to the inlet conduit between the brake unit and the control valve to force liquid into the brake unit or to withdraw liquid from the inlet conduit, and a check valve in the inlet conduit to prevent flow therefrom back into the reservoir.

7. A hydro-kinetic braking system comprising a brake unit including a casing and a rotor in the casing, a liquid reservoir, inlet and outlet flow conduits connecting the reservoir and the casing through which liquid can flow into and out of the casing, flow control valves in the inlet and outlet conduits, control means responsive to a difference in flow through the conduits to adjust the valves thereby to maintain the flows through the conduits equal, a variable volume accumulator connected to the inlet conduit to vary the volume of liquid in the brake unit, and a vent valve in the inlet conduit to vent it to atmosphere for emptying the brake unit.

8. A hydro-kinetic braking system comprising a brake unit including a casing and a rotor in the casing, a liquid reservoir, inlet and outlet flow conduits connecting the reservoir and the casing through which liquid can flow into and out of the casing, flow control valves in the inlet and outlet conduits, control means responsive to a difference in flow through the conduits to adjust the valves thereby to maintain the flows through the conduits equal, a variable volume accumulator connected to the inlet conduit to vary the volume of liquid in the brake unit, a vent valve in the inlet conduit to vent it to atmosphere for emptying the brake unit, a control device to supply operating pressure to the accumulator to vary its volume, and a connection from the control device to the vent valve to close the vent valve in response to said operating pressure.

9. A hydro-kinetic braking system comprising a brake unit including a casing and a rotor in the casing, a liquid reservoir, inlet and outlet flow conduits connecting the reservoir and the casing through which liquid can flow into and out of the casing, flow control valves in the inlet and outlet conduits, a control member movable in response to a difference in pressure on its opposite sides connected to both of the control valves to move them simultaneously in opposite directions, venturis in the conduits, connections from the throats of the venturis respectively to the opposite sides of the control member, a variable volume accumulator connected to the inlet conduit between the control valve therein and the brake unit, and a vent valve in the inlet conduit between the accumulator and the brake unit to vent the unit to atmosphere for emptying it.

10. A hydro-kinetic braking system comprising a brake unit including a casing and a rotor in the casing, a liquid reservoir, inlet and outlet flow conduits connecting the reservoir and the casing through which liquid can flow into and out of the casing, flow control valves in the inlet and outlet conduits, a control member movable in response to a difference in pressure on its opposite sides connected to both of the control valves to move them simultaneously in opposite directions, venturis in the conduits, connections from the throats of the venturis respectively to the opposite sides of the control member, a variable volume accumulator connected to the inlet conduit between the control valve therein and the brake unit, a control device to supply operating pressure to the accumulator to vary its volume, a normally open vent valve in the inlet conduit between the accumulator and the brake unit to vent the brake unit to atmosphere, and a connection from the control device to the vent valve to supply operating pressure to the vent valve to close it.

11. A hydro-kinetic braking system comprising a brake unit including a vaned casing and a vaned rotor in the casing arranged to produce a toroidal circulation of liquid upon relative rotation, the casing being formed adjacent its periphery with discharge ports subjected to the centrifugal liquid head in the casing and through which liquid tends to discharge from the casing, the vanes being formed with a plurality of supplemental ports lying near the center of the toroidal circulation where they are subject to a relatively low pressure, a liquid reservoir, a discharge connection from the discharge ports to the reservoir, an inlet connection from the lower part of the reservoir to certain of said supplemental ports to supply liquid to the brake unit, a vent connection from others of the supplemental ports to the top of the reservoir to vent air from the brake unit, control valves in the inlet and discharge connections, and control means for the control valves responsive to the difference in liquid flow through the inlet and discharge conduits.

12. A hydro-kinetic braking system comprising a brake unit including a vaned casing and a vaned rotor in the casing arranged to produce a toroidal circulation of liquid upon relative rotation, the casing being formed adjacent its periphery with discharge ports subjected to the centrifugal liquid head in the casing and through which liquid tends to discharge from the casing, the vanes being formed with a plurality of supplemental ports lying near the center of the toroidal circulation where they are subject to a relatively low pressure, a liquid reservoir, a discharge connection from the discharge ports to the reservoir, an inlet connection from the lower part of the reservoir to the supplemental ports to supply liquid to the brake unit, a variable volume accumulator connected to the inlet connection to force liquid into the brake unit or to withdraw liquid from the inlet connection, and a vent valve in the inlet connection between the accumulator and the brake unit to vent it to atmosphere for emptying the unit.

13. A hydro-kinetic braking system comprising a brake unit including a vaned casing and a vaned rotor in the casing arranged to produce a toroidal circulation of liquid upon relative rotation, the casing being formed adjacent its periphery with discharge ports subjected to the centrifugal liquid head in the casing and through which liquid tends to discharge from the casing, the vanes being formed with a plurality of supplemental ports lying near the center of the toroidal circulation where they are subject to a relatively low pressure, a liquid reservoir, a discharge connection from the discharge ports to the reservoir, an inlet connection from the lower part of the reservoir to the supplemental ports to supply liquid to the brake unit, control valves in the inlet and discharge connections, a control member movable in response to differences in pressure on its opposite sides and connected to the control valves to adjust them, venturis in the inlet and discharge connections, and connection from the throats of the venturis respectively to the opposite sides of the control member.

14. A hydro-kinetic braking system comprising a brake unit including a vaned casing and a vaned rotor in the casing arranged to produce a toroidal circulation of liquid upon relative rotation, the casing being formed adjacent its periphery with discharge ports subjected to the centrifugal liquid head in the casing and through which liquid tends to discharge from the casing, the vanes being formed with a plurality of supplemental ports lying near the center of the toroidal circulation where they are subject to a relatively low pressure, a liquid reservoir, a discharge connection from the discharge ports to the reservoir, an inlet connection from the lower part of the reservoir to the supplemental ports to supply liquid to the brake unit, control valves in the inlet and discharge connections, a control member movable in response to differences in pressure on its opposite sides and connected to the control valves to adjust them, venturis in the inlet and discharge connections, connections from the throats of the venturis respectively to the opposite sides of the control member, a variable volume accumulator connected to the inlet connection between the control valve therein and the brake unit to force liquid into the unit, and a check valve in the inlet connection between the control valve and the reservoir to prevent flow through the inlet connection into the reservoir.

15. A hydro-kinetic braking system for a railway car having a pressure tank and a triple valve thereon comprising a brake unit including a casing adapted to be secured against rotation on the car and a rotor in the casing adapted to be connected for rotation with a wheel of the car, a liquid reservoir, inlet and outlet flow conduits connecting the reservoir to the casing through which liquid can flow into and out of the casing, control valves in the conduits, control means for the valves responsive to flow through the conduits to maintain the flow substantially equal through the two conduits, a variable volume accumulator connected to the casing to vary the volume of liquid therein, and a connection between the accumulator and the triple valve to vary the effective accumulator volume in response to pressure supplied by the triple valve.

16. A hydro-kinetic braking system for a railway car having a pressure tank and a triple valve thereon comprising a brake unit including a casing adapted to be secured against rotation on the car and a rotor in the casing adapted to be connected for rotation with a wheel of the car, a liquid reservoir, inlet and outlet flow conduits connecting the reservoir to the casing through which liquid can flow into and out of the casing, control valves in the conduits, control means for the valves responsive to flow through the conduits to maintain the flow substantially equal through the two conduits, a variable volume accumulator connected to the casing to vary the volume of liquid therein, a normally open atmospheric vent valve connected to the inlet conduit to vent it to atmosphere for emptying the unit, and connections from the triple valve to the vent valve and the accumulator to close the vent valve and vary the effective volume of the accumulator in response to pressure supplied by the triple valve.

References Cited in the file of this patent

UNITED STATES PATENTS

| | | |
|---|---|---|
| 2,116,992 | Weaver | May 10, 1938 |
| 2,634,830 | Cline | Apr. 14, 1953 |

FOREIGN PATENTS

| | | |
|---|---|---|
| 537,867 | Germany | Nov. 7, 1931 |